US009363700B2

(12) United States Patent
Su et al.

(10) Patent No.: US 9,363,700 B2
(45) Date of Patent: Jun. 7, 2016

(54) METHOD AND DEVICE FOR REPORTING CHANNEL STATE

(75) Inventors: Xin Su, Beijing (CN); Qiubin Gao, Beijing (CN); Rakesh Tamrakar, Beijing (CN); Zukang Shen, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 124 days.

(21) Appl. No.: 13/991,152

(22) PCT Filed: Nov. 30, 2011

(86) PCT No.: PCT/CN2011/083218
§ 371 (c)(1),
(2), (4) Date: Sep. 16, 2013

(87) PCT Pub. No.: WO2012/072028
PCT Pub. Date: Jun. 7, 2012

(65) Prior Publication Data
US 2013/0343216 A1    Dec. 26, 2013

(30) Foreign Application Priority Data
Dec. 2, 2010 (CN) .......................... 2010 1 0569722

(51) Int. Cl.
| H04L 1/00 | (2006.01) |
| H04L 12/26 | (2006.01) |
| H04L 12/28 | (2006.01) |
| H04W 24/10 | (2009.01) |
| H04B 7/04 | (2006.01) |
| H04B 7/06 | (2006.01) |

(52) U.S. Cl.
CPC ............. *H04W 24/10* (2013.01); *H04B 7/0417* (2013.01); *H04L 1/0026* (2013.01); *H04B 7/063* (2013.01); *H04B 7/0632* (2013.01); *H04B 7/0639* (2013.01)

(58) Field of Classification Search
CPC ... H04W 24/10; H04B 7/0417; H04B 7/0632; H04B 7/0639; H04B 7/063; H04L 1/00
See application file for complete search history.

(56) References Cited

U.S. PATENT DOCUMENTS

| 2010/0091678 A1* | 4/2010 | Chen et al. ................ 370/252 |
| 2010/0091680 A1* | 4/2010 | Chun et al. ................ 370/252 |
| 2010/0183085 A1* | 7/2010 | Taoka et al. ............... 375/260 |
| 2010/0238824 A1* | 9/2010 | Farajidana et al. ......... 370/252 |
| 2010/0284484 A1* | 11/2010 | Jongren et al. ............. 375/267 |

FOREIGN PATENT DOCUMENTS

| CN | 101635950 A | 1/2010 |
| CN | 101800622 A | 8/2010 |
| CN | 101800628 A | 8/2010 |
| CN | 101860424 A | 10/2010 |
| CN | 101902307 A | 12/2010 |
| CN | 102045762 A | 5/2011 |
| CN | 102111246 A | 6/2011 |

OTHER PUBLICATIONS

Qualcomm Incorporated, "CSI Measurement Reference," 3GPP TSG-RAN WG1 #63, R1-106361, Jacksonville, Florida, USA, 8 pages, (Nov. 15-19, 2010).

3rd Generation Partnership Project, "3rd Generation Partnership Project; Technical Specification Group Radio Access Network; Evolved Universal Terrestrial Radio Access (E-UTRA); Physical layer procedures (Release 9)," 3GPP TS 36.213 V9.3.0, 80 pages, (Sep. 2010).

PCT International Search Report for PCT Counterpart Application No. PCT/CN2011/083218, 6 pgs., (Feb. 23, 2012).

PCT Written Opinion of the International Searching Authority for PCT Counterpart Application No. PCT/CN2011/083218, 5 pgs., (Feb. 23, 2012).

New Postcom, "Remaining Details in CSI-RS Signaling and PDSCH Muting Design", 3GPP TSG RAN WG1 Meeting #63, Draft No. R1-105938, Jacksonville, FL, USA, 10 pgs., (Nov. 15-19, 2010).

CMCC, CATT, "On Non-PMI Based Feedback in Rel-10", 3GPP TSG-RAN WG1#63, Draft No. R1-106313, Jacksonville, FL, USA, 4 pgs., (Nov. 15-19, 2010).

PCT Notification Concerning Transmittal of International Preliminary Report on Patentability (Chapter I of the Patent Cooperation Treaty) for PCT Counterpart Application No. PCT/CN2011/083218, 14 pp. (including English translation), (Jun. 13, 2013).

\* cited by examiner

*Primary Examiner* — Lonnie Sweet
(74) *Attorney, Agent, or Firm* — Blakely, Sokoloff, Taylor & Zafman LLP

(57) ABSTRACT

There is disclosed method for reporting channel state so as to report channel state based upon CSI-RS. The method includes: a UE detecting configuration information of Channel State Information-Reference Signal (CSI-RS), determining according to detection result the number of ports required to report channel state based upon CSI-RS, the UE determining CSI-RS based PMI feedback scheme to be adopted in preset corresponding relationship between the number of ports and feedback scheme upon determining that the eNB is to map data of Physical Downlink Shared Channel (PDSCH) onto P (number) CSI-RS ports for transmission in a codebook-based precoding scheme, wherein the codebook-based precoding scheme is a scheme as represented in the formula of $$\begin{bmatrix} y^{(0)} \\ \vdots \\ y^{(P-1)} \end{bmatrix} = W \cdot s,$$

wherein W represents a codebook consisted of a precoding matrix, S is PDSCH data consisted of data layers whose quantity is equal to value of Rank Indication (RI) and $$\begin{bmatrix} y^{(0)} \\ \vdots \\ y^{(P-1)} \end{bmatrix}$$

represents a vector consisted of data on P (number) CSI-RS ports; and the UE calculating and reporting channel state information according to the determination result. The invention further discloses apparatus for performing the method.

16 Claims, 5 Drawing Sheets

| Transmission mode | Transmission scheme of PDSCH |
|---|---|
| 1 | Single-antenna port, port 0 |
| 2 | Transmit diversity |
| 3 | Transmit diversity if the associated rank indicator is 1, otherwise large delay CDD |
| 4 | Closed-loop spatial multiplexing |
| 5 | Multi-user MIMO |
| 6 | Closed-loop spatial multiplexing with a single transmission layer |
| 7 | If the number of PBCH antenna ports is one, Single-antenna port, port 0; otherwise Transmit diversity |
| 8 | If the UE is configured without PMI/RI reporting: if the number of PBCH antenna ports is one, single-antenna port, port 0; otherwise transmit diversity<br><br>If the UE is configured with PMI/RI reporting: closed-loop spatial multiplexing |

Fig.1

METHOD AND DEVICE FOR REPORTING CHANNEL STATE

CROSS-REFERENCE TO RELATED APPLICATIONS

This patent application is a U.S. National Stage under 35 U.S.C. §371 of International Application No. PCT/CN2011/083218, filed on Nov. 30, 2011, entitled METHOD AND DEVICE FOR REPORTING CHANNEL STATE, designating the United States and claiming the benefit of Chinese Patent Application No. 201010569722.0, filed with the Chinese Patent Office on Dec. 2, 2010 and entitled "Method and Apparatus for Reporting Channel State", which is hereby incorporated by reference in its entirety.

FIELD OF THE INVENTION

The present invention relates to the field of communications and particularly to method and apparatus for reporting channel state.

BACKGROUND OF THE INVENTION

Channel quality information is important base for the network side to perform a variety of adaptive adjusting and scheduling. Channel quality is quantized in Long Term Evolution (LTE) into 4-bit Channel Quality Indicator (CQI) each with an index corresponding to combination of a modulation scheme and a coding rate. To calculate CQI, a UE has to assume transmission scheme of Physical Downlink Shared Channel (PDSCH) in view of its transmission mode. For example, transmission schemes of PDSCH are assumed as illustrated in FIG. 1 for calculation of CQI defined in LTE Release (Rel-9).

In each of the Transmission Modes (TMs) 4 to 6, a User Equipment (UE) has to calculate from detection of Cell-specific Reference Signal (CRS) and report its recommended Precoding Matrix Indicator (PMI), and the UE reports CQI assuming an evolved Node B (eNB) uses its reported PMI. In the TM7, a non-codebook precoding scheme is adopted, and the UE only reports CQI to the eNB, and the eNB calculates a precoding or shaping vector. In the TM8, both PMI and non-PMI feedback schemes can be supported, and the UE can generates report parameter (PMI/Rank Indication (RI)/CQI or CQI) from detection of CRS in a high-layer configured feedback scheme and specific report mode.

In a Long Term Evolution-Advanced (LTE-A) system, newly defined Channel State Information-Reference Signal (CSI-RS) is introduced so as to support higher-order Multiple-Input Multiple-Output (MIMO) transmission (support up to 8 data layers) as well as a multi-cell joint processing function in a subsequent release. In the TM9, a Demodulation Reference Signal (DMRS) based demodulation scheme is adopted, and CSI-RS only functions for detection instead of demodulation. Like the TM8, the eNB can configure in high-layer signaling a report mode of the UE as the PMI or non-PMI form. In the TM9, the UE configured without PMI reporting reports CQI based upon CRS, while the UE configured with PMI reporting has to generate CQI/PMI/RI or other report information from detection of CSI-RS. In this case, with the absence of a CSI-RS based feedback scheme, the UE calculating CQI can not assume which CSI-RS based transmission scheme is adopted for PDSCH and consequently can not report channel state based upon CSI-RS when calculating CQI.

SUMMARY OF THE INVENTION

Embodiments of the invention provide method and apparatus for reporting channel state so as to report channel state based upon CSI-RS.

A method for reporting channel state includes the steps of:
a UE detecting configuration information of Channel State Information-Reference Signal, CSI-RS;
the UE determining according to detection result the number of ports required to report channel state based upon CSI-RS;
the UE determining CSI-RS based Precoding Matrix Indicator (PMI) feedback scheme to be adopted by the UE according to the determined number of ports and preset corresponding relationship between the number of ports and feedback scheme upon determining that the eNB is to map data of Physical Downlink Shared Channel (PDSCH) onto P (number) CSI-RS ports for transmission in a codebook-based precoding scheme, wherein the codebook-based precoding scheme is a scheme as represented in the formula of $$\begin{bmatrix} y^{(0)} \\ \vdots \\ y^{(P-1)} \end{bmatrix} = W \cdot s,$$

wherein W represents a codebook consisted of a precoding matrix, S is PDSCH data consisted of data layers whose quantity is equal to value of Rank Indication (RI) and $$\begin{bmatrix} y^{(0)} \\ \vdots \\ y^{(P-1)} \end{bmatrix}$$

represents a vector consisted of data on P (number) CSI-RS ports; and
the UE calculating and reporting channel state information according to the determination result.

A user equipment includes:
a detection module configured to detect configuration information of Channel State Information-Reference Signal (CSI-RS);
a ports quantity module configured to determine according to detection result the number of ports required to report channel state based upon CSI-RS;
a transmission mode module configured to determine CSI-RS based Precoding Matrix Indicator (PMI) feedback scheme to be adopted by the UE according to the determined number of ports and preset corresponding relationship between the number of ports and feedback scheme upon determining that the eNB is to map data of Physical Downlink Shared Channel (PDSCH) onto P (number) CSI-RS ports for transmission in a codebook-based precoding scheme, wherein the codebook-based precoding scheme is a scheme as represented in the formula of $$\begin{bmatrix} y^{(0)} \\ \vdots \\ y^{(P-1)} \end{bmatrix} = W \cdot s,$$

wherein W represents a codebook consisted of a precoding matrix, S is PDSCH data consisted of data layers whose quantity is equal to value of Rank Indication (RI) and $$\begin{bmatrix} y^{(0)} \\ \vdots \\ y^{(P-1)} \end{bmatrix}$$

represents a vector consisted of data on P (number) CSI-RS ports; and a report module configured to calculate and report channel state information according to the determination result.

In the embodiments of the invention, a UE determines a corresponding feedback scheme according to the number of ports required to report channel state based upon CSI-RS and reports channel state information according to the determined feedback scheme to thereby address the problem in the prior art of failing to report channel state information because a transmission scheme to be adopted by an eNB can not be determined based upon CSI-RS.

BRIEF DESCRIPTION OF THE DRAWINGS

FIG. 1 is a diagram of relationship between a transmission scheme and a numbered transmission mode in the prior art;

DETAILED DESCRIPTION OF THE EMBODIMENTS

In embodiments of the invention, a UE determines a corresponding feedback scheme according to the number of ports required to report channel state based upon CSI-RS and reports channel state information according to the determined feedback scheme to thereby address the problem in the prior art of failing to report channel state information because a transmission scheme to be adopted by an eNB can not be determined based upon CSI-RS.

Figure 2:
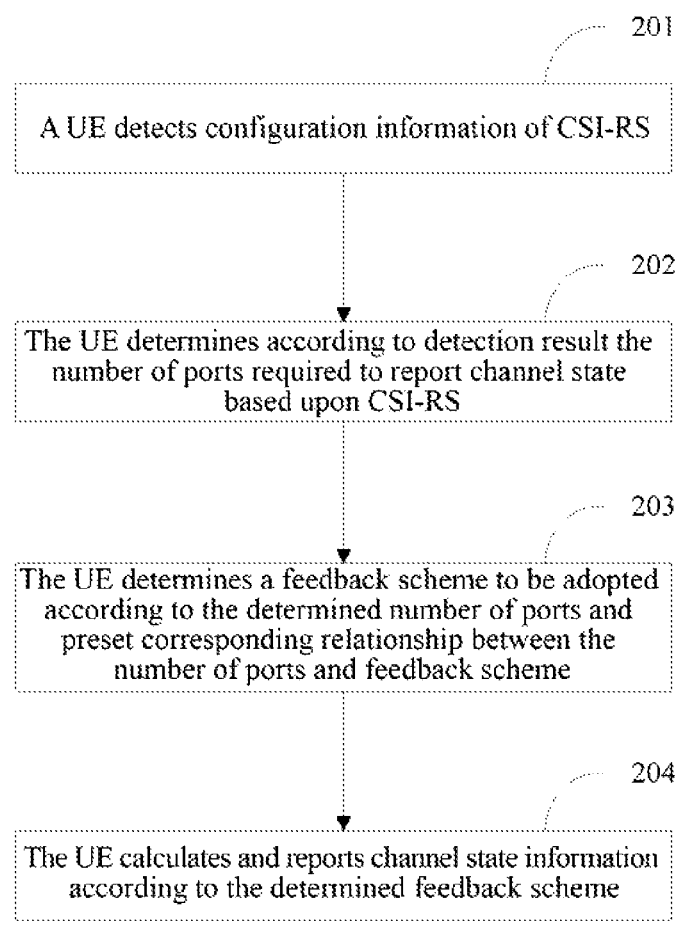
FIG. 2 is a flow chart of a general method for reporting channel state according to an embodiment of the invention.

Referring to FIG. 2, a flow chart of a general method for reporting channel state information according to an embodiment of the invention is as follows:

Step 201: A UE detects configuration information of CSI-RS.

Step 202: The UE determines according to detection result the number of ports required to report channel state based upon CSI-RS, where the configuration information of CSI-RS includes the number of ports, and the UE can obtain the number of ports from detection of the configuration information.

Step 203: The UE determines a feedback scheme to be adopted according to the determined number of ports and preset corresponding relationship between the number of ports and feedback scheme.

Step 204: The UE calculates and reports channel state information according to the determined feedback scheme.

Particularly when the number of ports required to report channel state based upon CSI-RS is equal to 1, the UE assumes that the eNB transmits over PDSCH via a single-antenna port (e.g., the port 0) without using a codebook, so the UE adopts non-PMI feedback scheme. When the number P of ports required to report channel state based upon CSI-RS is larger than 1, the UE assumes that the eNB is to map data of PDSCH onto P (number) CSI-RS ports in a codebook-based precoding scheme using a codebook, so the UE adopts a CSI-RS based PMI feedback scheme. Preferably the codebook-based precoding scheme is a scheme as represented in the formula of $$\begin{bmatrix} y^{(0)} \\ \vdots \\ y^{(P-1)} \end{bmatrix} = W \cdot s,$$

where W is a P×RI-dimension matrix representing a codebook consisted of a precoding matrix, particularly a codebook consisted of a precoding matrix selected from those defined in Rel-10, S is PDSCH data consisted of RI data layers, RI is a rank Indication reported by the UE, and $$\begin{bmatrix} y^{(0)} \\ \vdots \\ y^{(P-1)} \end{bmatrix}$$

represents a vector consisted of data on P (number) CSI-RS ports.

Specifically the UE determines that the eNB is to map the PDSCH data onto the P (number) CSI-RS ports for transmission in a scheme of $$\begin{bmatrix} \tilde{a}_{k,l}^{(15)} \\ \vdots \\ \tilde{a}_{k,l}^{(14+v)} \end{bmatrix} = W \begin{bmatrix} a_{k,l}^{(7)} \\ \vdots \\ a_{k,l}^{(6+v)} \end{bmatrix}$$

and also that the eNB is to map DMRS onto the P (number) CSI-RS ports for transmission in the same scheme, where $$\begin{bmatrix} \tilde{a}_{k,l}^{(15)} \\ \vdots \\ \tilde{a}_{k,l}^{(14+v)} \end{bmatrix}$$

represents $$\begin{bmatrix} y^{(0)} \\ \vdots \\ y^{(P-1)} \end{bmatrix}, \begin{bmatrix} a_{k,l}^{(7)} \\ \vdots \\ a_{k,l}^{(6+v)} \end{bmatrix}$$

represents S, $\tilde{a}_{k,l}^{(p)}$ ($p$=15, . . . 14+v) represents symbol transmitted over the k-th subcarrier in the l-th OFDM symbol via the p-th CSI-RS port, $a_{k,l}^{(p)}$ (p=7, . . . 6+v) represents PDSCH data or DMRS symbol over the k-th subcarrier in the l-th OFDM symbol via the p-th port, and v represents the number of layers of PDSCH, where the UE determines that the eNB will use PMI/RI recommended by the UE in the above mentioned mapping process, and the PMI/RI corresponds to the precoding matrix W in the codebook.

Due to a variety of feedback schemes, a report process will be introduced below in details for each feedback scheme in two embodiments.

Figure 3:
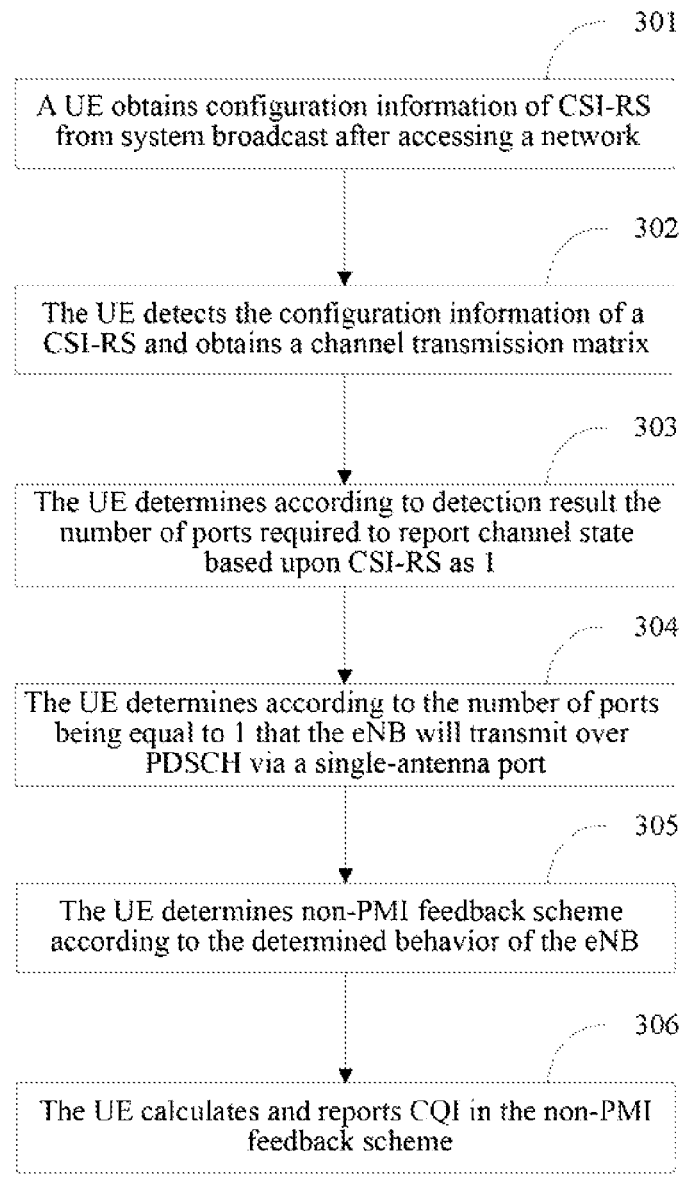
FIG. 3 is a flow chart of a method for reporting channel state information in non-PMI feedback scheme according to an embodiment of the invention.

Referring to FIG. 3, a flow chart of a method for reporting channel state information in non-PMI feedback scheme according to this embodiment is as follows:

Step 301: A UE obtains configuration information of CSI-RS from system broadcast after accessing a network, where the configuration information includes time and frequency locations, period, the number of ports, etc.

Step 302: The UE detects the configuration information of CSI-RS and obtains a channel transmission matrix $$H = \begin{bmatrix} h_{11} & \cdots & h_{1T} \\ \vdots & \ddots & \vdots \\ h_{R1} & \cdots & h_{RT} \end{bmatrix},$$

where $h_{ij}$ represents coefficient of channel transmission between the j-th transmission antenna and the i-th reception antenna, and R and T are the numbers of reception antennas and transmission antennas respectively. In the meantime the UE can detect received interference and noise.

Step 303: The UE determines according to detection result of the step S301 the number of ports required to report channel state based upon CSI-RS as 1.

Step 304: The UE determines according to the number of ports being equal to 1 that the eNB will transmit over PDSCH via a single-antenna port.

Step 305: The UE determines non-PMI feedback scheme according to the determined behavior of the eNB to transmit over PDSCH via a single-antenna port.

Step 306: The UE calculates and reports CQI in the non-PMI feedback scheme, particularly calculates and reports CQI for each report unit in the frequency domain (e.g., wideband or subband). Since no codebook is required at this time, simply CQI will be reported.

Figure 4:
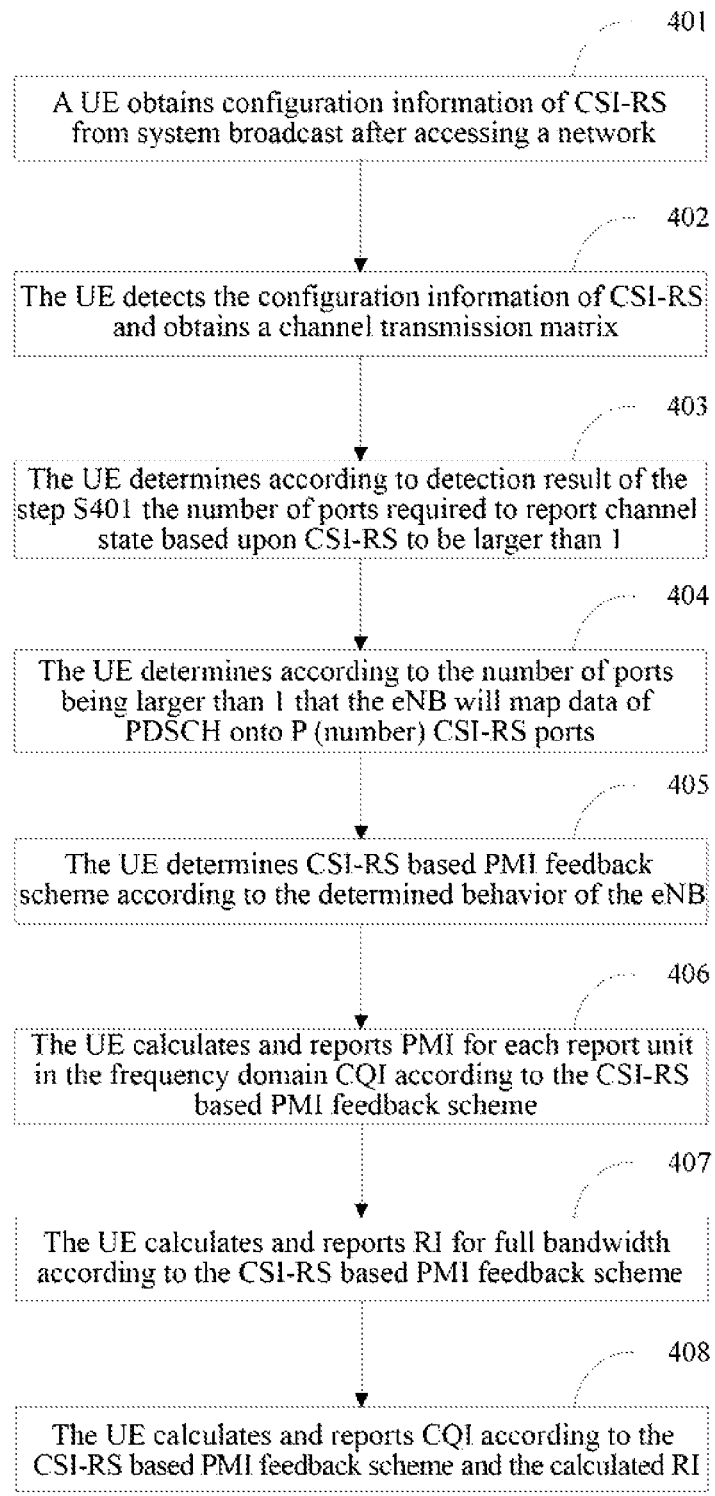
FIG. 4 is a flow chart of a method for reporting channel state information in CSI-RS based PMI feedback scheme according to an embodiment of the invention.

Referring to FIG. 4, a flow chart of a method for reporting channel state information in CSI-RS based PMI feedback scheme according to this embodiment is as follows:

Step 401: A UE obtains configuration information of CSI-RS from system broadcast after accessing a network.

Step 402: The UE detects the configuration information of CSI-RS and obtains a channel transmission matrix $$H = \begin{bmatrix} h_{11} & \cdots & h_{1T} \\ \vdots & \ddots & \vdots \\ h_{R1} & \cdots & h_{RT} \end{bmatrix}.$$

In the meantime the UE can detect received interference and noise.

Step 403: The UE determines according to detection result of the step S401 the number of ports required to report channel state based upon CSI-RS to be larger than 1.

Step 404: The UE determines according to the number of ports being larger than 1 that the eNB will map data of PDSCH onto P (number) CSI-RS ports by $$\begin{bmatrix} y^{(0)} \\ \vdots \\ y^{(P-1)} \end{bmatrix} = W \cdot s$$

for transmission.

Step 405: The UE determines CSI-RS based PMI feedback scheme according to the determined behavior of the eNB.

Step 406: The UE calculates and reports PMI for each report unit in the frequency domain CQI according to the CSI-RS based PMI feedback scheme, where the PMI represents an index in the codebook corresponding to W.

Step 407: The UE calculates and reports RI for full bandwidth according to the CSI-RS based PMI feedback scheme.

Step 408: The UE calculates and reports CQI, particularly calculates and reports CQI for each report unit in the frequency domain (e.g., wideband or subband), according to the CSI-RS based PMI feedback scheme and the calculated RI. When the RI is equal to 1, the UE calculates and reports one CQI in each report unit in the frequency domain, and when the RI is larger than 1, the UE calculates and reports CQI respectively for two codewords in each report unit in the frequency domain.

An implementation process of reporting channel state information has been learned from the foregoing description and this process is generally performed by a UE, and an internal structure and functions of the UE will be introduced below.

Figure 5:
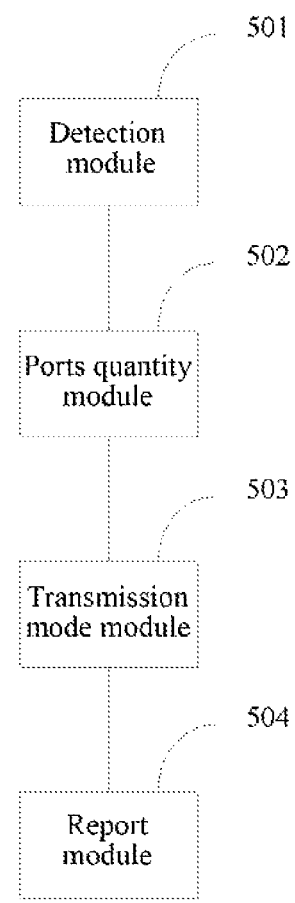
FIG. 5 is a structural diagram of a UE according to an embodiment of the invention.

Referring to FIG. 5, the UE according to this embodiment includes a detection module 501, a ports quantity module 502, a transmission mode module 503 and a report module 504.

The detection module 501 is configured to detect Channel State Information-Reference Signal (CSI-RS). The detection module 501 is further configured to obtain a channel transmission matrix $$H = \begin{bmatrix} h_{11} & \cdots & h_{1T} \\ \vdots & \ddots & \vdots \\ h_{R1} & \cdots & h_{RT} \end{bmatrix}.$$

In the meantime the detection module 501 is further configured to detect received interference and noise.

The ports quantity module 502 is configured to determine according to detection result the number of ports required to report channel state based upon CSI-RS.

The transmission mode module 503 is configured to determine a feedback scheme to be adopted according to the determined number of ports and preset corresponding relationship between the number of ports and feedback scheme. The preset corresponding relationship between the number of ports and feedback scheme includes the number of ports being equal to 1 corresponding to non-PMI feedback scheme and the number of ports being larger than 1 corresponding to CSI-RS based PMI feedback scheme. The transmission mode module 503 determines according to the number of ports being equal to 1 that the eNB will transmit over PDSCH via a single-antenna port and further determines non-PMI feedback scheme; or the transmission mode module 503 determines according to the number of ports being larger than 1 that the eNB will map data of PDSCH onto P (number) CSI-RS ports for transmission in a codebook-based precoding scheme and further determines CSI-RS based PMI feedback scheme. The codebook-based precoding scheme includes a scheme represented in the formula of $$\begin{bmatrix} y^{(0)} \\ \vdots \\ y^{(P-1)} \end{bmatrix} = W \cdot s,$$

where W represents a codebook consisted of a precoding matrix, S is PDSCH data consisted of RI data layers, and $$\begin{bmatrix} y^{(0)} \\ \vdots \\ y^{(P-1)} \end{bmatrix}$$

represents a vector consisted of data on P (number) CSI-RS ports.

Specifically the transmission mode module 503 determines that the eNB is to map the PDSCH data onto the P (number) CSI-RS ports for transmission in a scheme of $$\begin{bmatrix} \tilde{a}_{k,l}^{(15)} \\ \vdots \\ \tilde{a}_{k,l}^{(14+v)} \end{bmatrix} = W \begin{bmatrix} a_{k,l}^{(7)} \\ \vdots \\ a_{k,l}^{(6+v)} \end{bmatrix}$$

and also that the eNB is to map DMRS onto the P (number) CSI-RS ports for transmission in the same scheme, where $$\begin{bmatrix} \tilde{a}_{k,l}^{(15)} \\ \vdots \\ \tilde{a}_{k,l}^{(14+v)} \end{bmatrix}$$

represents $$\begin{bmatrix} y^{(0)} \\ \vdots \\ y^{(P-1)} \end{bmatrix}, \begin{bmatrix} a_{k,l}^{(7)} \\ \vdots \\ a_{k,l}^{(6+v)} \end{bmatrix}$$

represents S, $\tilde{a}_{k,l}^{(\tilde{p})}$ ($\tilde{p}$=15, ... 14+v) represents symbol transmitted over the k-th subcarrier in the l-th OFDM symbol via the $\tilde{p}$-th CSI-RS port, $a_{k,l}^{(p)}$ (p=7, ... 6+v) represents PDSCH data or DMRS symbol over the k-th subcarrier in the l-th OFDM symbol via the p-th port, and v represents the number of layers of PDSCH, where the transmission mode module 503 determines that the eNB will use PMI/RI recommended by the UE in the above mentioned mapping process, and the PMI/RI corresponds to the precoding matrix W in the codebook.

The report module 504 is configured to calculate and report channel state information according to the determined feedback scheme. When the determined feedback scheme is non-PMI feedback scheme, the reported channel state information includes Channel Quality Indicator (CQI), that is, the report module 504 calculates and reports CQI. When the determined feedback scheme is CSI-RS based PMI feedback scheme, the reported channel state information includes CQI, PMI and RI, that is, the report module 504 calculates and reports CQI, PMI and RI. Specifically when the determined feedback scheme is CSI-RS based PMI feedback scheme, the report module 504 calculates and reports PMI for each report unit in the frequency domain according to the CSI-RS based PMI feedback scheme, calculates and reports RI for full bandwidth according to the CSI-RS based PMI feedback scheme, and calculates and reports CQI according to the CSI-RS based PMI feedback scheme and the calculated RI. When the RI is equal to 1, the report module 504 calculates and reports one CQI in each report unit in the frequency domain, and when the RI is larger than 1, the report module 504 calculates and reports CQI respectively for two codewords in each report unit in the frequency domain.

The report module 504 includes a calculation unit and an interface unit. The calculation unit is configured to calculate the channel state information. The interface unit is configured to transmit the channels state information. The interface unit is further configured to obtain the configuration information of CSI-RS from system broadcast.

In the embodiments of the invention, a UE determines corresponding transmission mode according to the number of ports required to report channel state based upon CSI-RS and reports channel state information according to the determined feedback scheme to thereby address the problem in the prior art of failing to report channel state information because transmission scheme to be adopted by an eNB can not be determined based upon CSI-RS. The embodiments of the invention give a corresponding transmission mode, and particularly provide channel state information to be calculated and reported, for different number of ports.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

What is claimed is:

1. A method for reporting channel state, comprising:
   detecting, by a User Equipment (UE), configuration information of Channel State Information-Reference Signal (CSI-RS);
   determining, by the UE, according to detection result, number of ports required to report channel state based upon the CSI-RS;
   determining, by the UE, that an evolved Node B (eNB) is to map data of Physical Downlink Shared Channel (PDSCH) onto P (number) CSI-RS ports for transmission according to a codebook-based precoding scheme, upon determining CSI-RS based Precoding Matrix Indicator (PMI) feedback scheme to be adopted by the eNB according to the determined number of ports and preset corresponding relationship between the number of ports and feedback scheme, wherein the codebook-based precoding scheme is a scheme as represented in the formula of $$\begin{bmatrix} y^{(0)} \\ \vdots \\ y^{(P-1)} \end{bmatrix} = W \cdot s,$$

W represents a codebook consisted of a precoding matrix, s is PDSCH data consisted of data layers whose quantity is equal to value of Rank Indication (RI) and $$\begin{bmatrix} y^{(0)} \\ \vdots \\ y^{(P-1)} \end{bmatrix}$$

represents a vector consisted of data on P (number) CSI-RS ports; and
   calculating, by the UE, channel state information according to determination result, and reporting the channel state information to the eNB;
   wherein each of the UE and the eNB compromises a transmitter that transmits messages and a receiver that receives messages, and the UE reports the channel state information via the transmitter comprised in the UE to the eNB;
   wherein the preset corresponding relationship between the number of ports and feedback scheme comprises:
   the number of ports being equal to 1 corresponds to non-PMI feedback scheme; and
   the number of ports being larger than 1 corresponds to the CSI-RS based PMI feedback scheme.

2. The method according to claim 1, wherein when determined feedback scheme is the CSI-RS based PMI feedback scheme, the reported channel state information comprises CQI, PMI and RI.

3. The method according to claim 2, wherein when the determined feedback scheme is the CSI-RS based PMI feedback scheme, an operation of calculating, by the UE, channel state information according to the determination result and reporting the channel state information to the eNB comprises:
   calculating, by the UE, the PMI for each report unit in the frequency domain according to determined mapping scheme, and reporting the PMI to the eNB;
   calculating, by the UE, the RI for full bandwidth according to the determined mapping scheme, and reporting the RI to the eNB; and
   calculating, by the UE, the CQI according to the determined mapping scheme, the PMI and the RI, and reporting the CQI to the eNB.

4. The method according to claim 3, wherein an operation of calculating, by the UE, the CQI according to the CSI-RS based PMI feedback scheme and the calculated RI, and reporting the CQI to the eNB comprises:
   calculating, by the UE, one CQI in each report unit in the frequency domain when the RI is equal to 1, and reporting the one CQI to the eNB; and
   calculating, by the UE, CQI respectively for two codewords in each report unit in the frequency domain when the RI is larger than 1, and reporting the CQI respectively for two codewords to the eNB.

5. The method according to claim 1, wherein the determining, by the UE, that the eNB is to map data of PDSCH onto P (number) CSI-RS ports for transmission according to the scheme as represented in the formula of $$\begin{bmatrix} y^{(0)} \\ \vdots \\ y^{(P-1)} \end{bmatrix} = W \cdot s$$

comprises:
   determining, by the UE, that the eNB is to map the PDSCH data onto the P (number) CSI-RS ports for transmission according to a scheme of $$\begin{bmatrix} \tilde{a}_{k,l}^{(15)} \\ \vdots \\ \tilde{a}_{k,l}^{(14+\upsilon)} \end{bmatrix} = W \begin{bmatrix} a_{k,l}^{(7)} \\ \vdots \\ a_{k,l}^{(6+\upsilon)} \end{bmatrix}$$

and also that the eNB is to map DMRS onto the P (number) CSI-RS ports for transmission according to the same scheme, wherein $$\begin{bmatrix} \tilde{a}_{k,l}^{(15)} \\ \vdots \\ \tilde{a}_{k,l}^{(14+\upsilon)} \end{bmatrix}$$

represents $$\begin{bmatrix} y^{(0)} \\ \vdots \\ y^{(P-1)} \end{bmatrix}, \begin{bmatrix} a_{k,l}^{(7)} \\ \vdots \\ a_{k,l}^{(6+v)} \end{bmatrix}$$

represents s, $\tilde{a}_{k,l}^{(\tilde{p})}$ ($\tilde{p}=15, \ldots 14+v$) represents symbol transmitted over the k-th subcarrier in the l-th OFDM symbol via the $\tilde{p}$-th CSI-RS port, $a_{k,l}^{(p)}$ (p=7, ... 6+v) represents PDSCH data or DMRS symbol over the k-th subcarrier in the l-th OFDM symbol via the p-th port, and v represents the number of layers of PDSCH, wherein the UE determines that the eNB is to use PMI/RI recommended by the UE in the above mentioned mapping process, and the PMI/RI corresponds to the precoding matrix W in the codebook.

6. The method according to claim 2, wherein the determining, by the UE, that the eNB is to map data of PDSCH onto P (number) CSI-RS ports for transmission according to the scheme as represented in the formula of $$\begin{bmatrix} y^{(0)} \\ \vdots \\ y^{(P-1)} \end{bmatrix} = W \cdot s$$

comprises:
  determining, by the UE, that the eNB is to map the PDSCH data onto the P (number) CSI-RS ports for transmission according to a scheme of $$\begin{bmatrix} \tilde{a}_{k,l}^{(15)} \\ \vdots \\ \tilde{a}_{k,l}^{(14+v)} \end{bmatrix} = W \begin{bmatrix} a_{k,l}^{(7)} \\ \vdots \\ a_{k,l}^{(6+v)} \end{bmatrix}$$

and also that the eNB is to map DMRS onto the P (number) CSI-RS ports for transmission according to the same scheme, wherein $$\begin{bmatrix} \tilde{a}_{k,l}^{(15)} \\ \vdots \\ \tilde{a}_{k,l}^{(14+v)} \end{bmatrix}$$

represents $$\begin{bmatrix} y^{(0)} \\ \vdots \\ y^{(P-1)} \end{bmatrix}, \begin{bmatrix} a_{k,l}^{(7)} \\ \vdots \\ a_{k,l}^{(6+v)} \end{bmatrix}$$

represents s, $\tilde{a}_{k,l}^{(\tilde{p})}$ ($\tilde{p}=15, \ldots 14+v$) represents symbol transmitted over the k-th subcarrier in the l-th OFDM symbol via the $\tilde{p}$-th CSI-RS port, $a_{k,l}^{(p)}$ (p=7, ... 6+v) represents PDSCH data or DMRS symbol over the k-th subcarrier in the l-th OFDM symbol via the p-th port, and v represents the number of layers of PDSCH, wherein the UE determines that the eNB is to use PMI/RI recommended by the UE in the above mentioned mapping process, and the PMI/RI corresponds to the precoding matrix W in the codebook.

7. The method according to claim 3, wherein the determining, by the UE, that the eNB is to map data of PDSCH onto P (number) CSI-RS ports for transmission according to the scheme as represented in the formula of $$\begin{bmatrix} y^{(0)} \\ \vdots \\ y^{(P-1)} \end{bmatrix} = W \cdot s$$

comprises:
  determining, by the UE, that the eNB is to map the PDSCH data onto the P (number) CSI-RS ports for transmission according to a scheme of $$\begin{bmatrix} \tilde{a}_{k,l}^{(15)} \\ \vdots \\ \tilde{a}_{k,l}^{(14+v)} \end{bmatrix} = W \begin{bmatrix} a_{k,l}^{(7)} \\ \vdots \\ a_{k,l}^{(6+v)} \end{bmatrix}$$

and also that the eNB is to map DMRS onto the P (number) CSI-RS ports for transmission according to the same scheme, wherein $$\begin{bmatrix} \tilde{a}_{k,l}^{(15)} \\ \vdots \\ \tilde{a}_{k,l}^{(14+v)} \end{bmatrix}$$

represents $$\begin{bmatrix} y^{(0)} \\ \vdots \\ y^{(P-1)} \end{bmatrix}, \begin{bmatrix} a_{k,l}^{(7)} \\ \vdots \\ a_{k,l}^{(6+v)} \end{bmatrix}$$

represents s, $\tilde{a}_{k,l}^{(\tilde{p})}$ ($\tilde{p}=15, \ldots 14+v$) represents symbol transmitted over the k-th subcarrier in the l-th OFDM symbol via the $\tilde{p}$-th CSI-RS port, $a_{k,l}^{(p)}$ (p=7, ... 6+v) represents PDSCH data or DMRS symbol over the k-th subcarrier in the l-th OFDM symbol via the p-th port, and v represents the number of layers of PDSCH, wherein the UE determines that the eNB is to use PMI/RI recommended by the UE in the above mentioned mapping process, and the PMI/RI corresponds to the precoding matrix W in the codebook.

8. The method according to claim 4, wherein the determining, by the UE, that the eNB is to map data of PDSCH onto P (number) CSI-RS ports for transmission according to the scheme as represented in the formula of $$\begin{bmatrix} y^{(0)} \\ \vdots \\ y^{(P-1)} \end{bmatrix} = W \cdot s$$

comprises:
  determining, by the UE, that the eNB is to map the PDSCH data onto the P (number) CSI-RS ports for transmission according to a scheme of $$\begin{bmatrix} \tilde{a}_{k,l}^{(15)} \\ \vdots \\ \tilde{a}_{k,l}^{(14+v)} \end{bmatrix} = W \begin{bmatrix} a_{k,l}^{(7)} \\ \vdots \\ a_{k,l}^{(6+v)} \end{bmatrix}$$

and also that the eNB is to map DMRS onto the P (number) CSI-RS ports for transmission according to the same scheme, wherein $$\begin{bmatrix} \tilde{a}_{k,l}^{(15)} \\ \vdots \\ \tilde{a}_{k,l}^{(14+v)} \end{bmatrix}$$

represents $$\begin{bmatrix} y^{(0)} \\ \vdots \\ y^{(P-1)} \end{bmatrix}, \begin{bmatrix} a_{k,l}^{(7)} \\ \vdots \\ a_{k,l}^{(6+v)} \end{bmatrix}$$

represents s, $\tilde{a}_{k,l}^{(\tilde{p})}$ ($\tilde{p}=15, \ldots 14+v$) represents symbol transmitted over the k-th subcarrier in the l-th OFDM symbol via the $\tilde{p}$-th CSI-RS port, $a_{k,l}^{(p)}$ (p=7, ... 6+v) represents PDSCH data or DMRS symbol over the k-th subcarrier in the l-th OFDM symbol via the p-th port, and v represents the number of layers of PDSCH, wherein the UE determines that the eNB is to use PMI/RI recommended by the UE in the above mentioned mapping process, and the PMI/RI corresponds to the precoding matrix W in the codebook.

9. A user equipment, comprising:
a processor; and
a non-transitory computer readable storage medium with an executable program stored thereon, wherein the program instructs the processor to perform operations comprising:
detecting configuration information of Channel State Information-Reference Signal (CSI-RS);
determining, according to detection result, number of ports required to report channel state based upon CSI-RS;
determining that an eNB is to map data of Physical Downlink Shared Channel (PDSCH) onto P (number) CSI-RS ports for transmission according to a codebook-based precoding scheme, upon determining CSI-RS based Precoding Matrix Indicator (PMI) feedback scheme to be adopted by the eNB according to the determined number of ports and preset corresponding relationship between the number of ports and feedback scheme, wherein the codebook-based precoding scheme is a scheme as represented in the formula of $$\begin{bmatrix} y^{(0)} \\ \vdots \\ y^{(P-1)} \end{bmatrix} = W \cdot s,$$

wherein W represents a codebook consisted of a precoding matrix, s is PDSCH data consisted of data layers whose quantity is equal to value of Rank Indication (RI) and $$\begin{bmatrix} y^{(0)} \\ \vdots \\ y^{(P-1)} \end{bmatrix}$$

represents a vector consisted of data on P (number) CSI-RS ports; and
calculating channel state information according to determination result and triggering the UE to report the channel state information to the eNB;
wherein each of the UE and the eNB compromises a transmitter that transmits messages and a receiver that receives messages, and the transmitter comprised in the UE is further configured to report the channel state information to the eNB;
wherein the preset corresponding relationship between the number of ports and feedback scheme comprises:
the number of ports being equal to 1 corresponding to non-PMI feedback scheme; and
the number of ports being larger than 1 corresponding to CSI-RS based PMI feedback scheme.

10. The user equipment according to claim 9, wherein when determined feedback scheme is CSI-RS based PMI feedback scheme, the reported channel state information comprises CQI, PMI and R.

11. The user equipment according to claim 10, wherein when the determined feedback scheme is CSI-RS based PMI feedback scheme, the operations further comprises calculating PMI for each report unit in the frequency domain according to determined mapping scheme and triggering the UE to report the PMI to the eNB; calculating RI for full bandwidth according to the determined mapping scheme and triggering the UE to report the RI to the eNB; and calculating CQI according to the determined mapping scheme, the PMI and the RI, and triggering the UE to report the CQI to the eNB.

12. The user equipment according to claim 11, wherein the operations further comprises: calculating one CQI in each report unit in the frequency domain when the RI is equal to 1, and triggering the UE to report the one CQI to the eNB; and calculating CQI respectively for two codewords in each report unit in the frequency domain when the RI is larger than 1, and triggering the UE to report the CQI respectively for two codewords to the eNB.

13. The user equipment according to claim 9, wherein the operation of determining that the eNB is to map data of PDSCH onto P (number) CSI-RS ports for transmission according to the scheme as represented in the formula of $$\begin{bmatrix} y^{(0)} \\ \vdots \\ y^{(P-1)} \end{bmatrix} = W \cdot s$$

further comprises:
determining that the eNB is to map the PDSCH data onto the P (number) CSI-RS ports for transmission according to a scheme of $$\begin{bmatrix} \tilde{a}_{k,l}^{(15)} \\ \vdots \\ \tilde{a}_{k,l}^{(14+v)} \end{bmatrix} = W \begin{bmatrix} a_{k,l}^{(7)} \\ \vdots \\ a_{k,l}^{(6+v)} \end{bmatrix}$$

and also that the eNB is to map DMRS onto the P (number) CSI-RS ports for transmission according to the same scheme, wherein $$\begin{bmatrix} \tilde{a}_{k,l}^{(15)} \\ \vdots \\ \tilde{a}_{k,l}^{(14+v)} \end{bmatrix}$$

represents $$\begin{bmatrix} y^{(0)} \\ \vdots \\ y^{(P-1)} \end{bmatrix}, \begin{bmatrix} a_{k,l}^{(7)} \\ \vdots \\ a_{k,l}^{(6+v)} \end{bmatrix}$$

represents s, $\tilde{a}_{k,l}^{(\tilde{p})}$ ($\tilde{p}=15, \ldots 14+v$) represents symbol transmitted over the k-th subcarrier in the l-th OFDM symbol via the $\tilde{p}$-th CSI-RS port, $a_{k,l}^{(p)}$ ($p=7, \ldots 6+v$) represents PDSCH data or DMRS symbol over the k-th subcarrier in the l-th OFDM symbol via the p-th port, and v represents the number of layers of PDSCH, wherein it is determined that the eNB is to use PMI/RI recommended by the UE in the above mentioned mapping process, and the PMI/RI corresponds to the precoding matrix W in the codebook.

14. The user equipment according to claim 10, wherein the operation of determining that the eNB is to map data of PDSCH onto P (number) CSI-RS ports for transmission according to the scheme as represented in the formula of $$\begin{bmatrix} y^{(0)} \\ \vdots \\ y^{(P-1)} \end{bmatrix} = W \cdot s$$

further comprises:
  determining that the eNB is to map the PDSCH data onto the P (number) CSI-RS ports for transmission according to a scheme of $$\begin{bmatrix} \tilde{a}_{k,l}^{(15)} \\ \vdots \\ \tilde{a}_{k,l}^{(14+v)} \end{bmatrix} = W \begin{bmatrix} a_{k,l}^{(7)} \\ \vdots \\ a_{k,l}^{(6+v)} \end{bmatrix}$$

and also that the eNB is to map DMRS onto the P (number) CSI-RS ports for transmission according to the same scheme, wherein $$\begin{bmatrix} \tilde{a}_{k,l}^{(15)} \\ \vdots \\ \tilde{a}_{k,l}^{(14+v)} \end{bmatrix}$$

represents $$\begin{bmatrix} y^{(0)} \\ \vdots \\ y^{(P-1)} \end{bmatrix}, \begin{bmatrix} a_{k,l}^{(7)} \\ \vdots \\ a_{k,l}^{(6+v)} \end{bmatrix}$$

represents s, $\tilde{a}_{k,l}^{(\tilde{p})}$ ($\tilde{p}=15, \ldots 14+v$) represents symbol transmitted over the k-th subcarrier in the l-th OFDM symbol via the $\tilde{p}$-th CSI-RS port, $a_{k,l}^{(p)}$ ($p=7, \ldots 6+v$) represents PDSCH data or DMRS symbol over the k-th subcarrier in the l-th OFDM symbol via the p-th port, and v represents the number of layers of PDSCH, wherein it is determined that the eNB is to use PMI/RI recommended by the UE in the above mentioned mapping process, and the PMI/RI corresponds to the precoding matrix W in the codebook.

15. The user equipment according to claim 11, wherein the operation of determining that the eNB is to map data of PDSCH onto P (number) CSI-RS ports for transmission according to the scheme as represented in the formula of $$\begin{bmatrix} y^{(0)} \\ \vdots \\ y^{(P-1)} \end{bmatrix} = W \cdot s$$

further comprises:
  determining that the eNB is to map the PDSCH data onto the P (number) CSI-RS ports for transmission according to a scheme of $$\begin{bmatrix} \tilde{a}_{k,l}^{(15)} \\ \vdots \\ \tilde{a}_{k,l}^{(14+v)} \end{bmatrix} = W \begin{bmatrix} a_{k,l}^{(7)} \\ \vdots \\ a_{k,l}^{(6+v)} \end{bmatrix}$$

and also that the eNB is to map DMRS onto the P (number) CSI-RS ports for transmission according to the same scheme, wherein $$\begin{bmatrix} \tilde{a}_{k,l}^{(15)} \\ \vdots \\ \tilde{a}_{k,l}^{(14+v)} \end{bmatrix}$$

represents $$\begin{bmatrix} y^{(0)} \\ \vdots \\ y^{(P-1)} \end{bmatrix}, \begin{bmatrix} a_{k,l}^{(7)} \\ \vdots \\ a_{k,l}^{(6+v)} \end{bmatrix}$$

represents s, $\tilde{a}_{k,l}^{(\tilde{p})}$ ($\tilde{p}=15, \ldots 14+v$) represents symbol transmitted over the k-th subcarrier in the l-th OFDM symbol via the $\tilde{p}$-th CSI-RS port, $a_{k,l}^{(p)}$ (p=7, ... 6+v) represents PDSCH data or DMRS symbol over the k-th subcarrier in the l-th OFDM symbol via the p-th port, and v represents the number of layers of PDSCH, wherein it is determined that the eNB is to use PMI/RI recommended by the UE in the above mentioned mapping process, and the PMI/RI corresponds to the precoding matrix W in the codebook.

16. The user equipment according to claim 12, wherein the operation of determining that the eNB is to map data of PDSCH onto P (number) CSI-RS ports for transmission according to the scheme as represented in the formula of $$\begin{bmatrix} y^{(0)} \\ \vdots \\ y^{(P-1)} \end{bmatrix} = W \cdot s$$

further comprises:
  determining that the eNB is to map the PDSCH data onto the P (number) CSI-RS ports for transmission according to a scheme of $$\begin{bmatrix} \tilde{a}_{k,l}^{(15)} \\ \vdots \\ \tilde{a}_{k,l}^{(14+v)} \end{bmatrix} = W \begin{bmatrix} a_{k,l}^{(7)} \\ \vdots \\ a_{k,l}^{(6+v)} \end{bmatrix}$$

and also that the eNB is to map DMRS onto the P (number) CSI-RS ports for transmission according to the same scheme, wherein $$\begin{bmatrix} \tilde{a}_{k,l}^{(15)} \\ \vdots \\ \tilde{a}_{k,l}^{(14+v)} \end{bmatrix}$$

represents $$\begin{bmatrix} y^{(0)} \\ \vdots \\ y^{(P-1)} \end{bmatrix}, \begin{bmatrix} a_{k,l}^{(7)} \\ \vdots \\ a_{k,l}^{(6+v)} \end{bmatrix}$$

represents s, $\tilde{a}_{k,l}^{(\tilde{p})}$ ($\tilde{p}=15, \ldots 14+v$) represents symbol transmitted over the k-th subcarrier in the l-th OFDM symbol via the $\tilde{p}$-th CSI-RS port, $a_{k,l}^{(p)}$ (p=7, ... 6+v) represents PDSCH data or DMRS symbol over the k-th subcarrier in the l-th OFDM symbol via the p-th port, and v represents the number of layers of PDSCH, wherein it is determined that the eNB is to use PMI/RI recommended by the UE in the above mentioned mapping process, and the PMI/RI corresponds to the precoding matrix W in the codebook.

\* \* \* \* \*